(12) United States Patent
Fisher (10) Patent No.: US 10,107,906 B2
(45) Date of Patent: Oct. 23, 2018

(54) METHOD AND APPARATUS FOR DETECTING PHYSICAL PERFORMANCE

(71) Applicant: DEOTOME PTY LTD, Wacol, Queensland (AU)

(72) Inventor: Mark Raymond Fisher, Wacol (AU)

(73) Assignee: DEOTOME PTY LTD., Wacol, Queensland (AU)

( * ) Notice: Subject to any disclaimer, the term of this patent is extended or adjusted under 35 U.S.C. 154(b) by 0 days.

(21) Appl. No.: 15/538,270

(22) PCT Filed: Dec. 18, 2015

(86) PCT No.: PCT/AU2015/050819
§ 371 (c)(1),
(2) Date: Jun. 21, 2017

(87) PCT Pub. No.: WO2016/101023
PCT Pub. Date: Jun. 30, 2016

(65) Prior Publication Data
US 2017/0350977 A1    Dec. 7, 2017

(30) Foreign Application Priority Data

Dec. 22, 2014    (AU) ............................... 2014905192

(51) Int. Cl.
*G01S 15/04*    (2006.01)
*G01S 15/10*    (2006.01)
(Continued)

(52) U.S. Cl.
CPC ............... *G01S 15/04* (2013.01); *A63B 69/00* (2013.01); *A63B 2220/12* (2013.01);
(Continued)

(58) Field of Classification Search
CPC .......... G01S 15/04; G01S 15/10; G01S 15/42; G01S 15/88; A63B 69/00
(Continued)

(56) References Cited

U.S. PATENT DOCUMENTS 6,710,713 B1    3/2004    Russo
2008/0269644 A1    10/2008    Ray
(Continued)

FOREIGN PATENT DOCUMENTS

WO    2007/122408 A1    11/2007

OTHER PUBLICATIONS

International Search Report dated Feb. 26, 2016 for Application No. PCT/AU2015/050819.
(Continued)

*Primary Examiner* — Allen T Cao
(74) *Attorney, Agent, or Firm* — Ladas & Parry LLP; Malcolm J. MacDonald (57) ABSTRACT

A device for sensing a passing athlete. The device has one or more signal sources for irradiating distinct segments of space about the device. One or more sensors are associated with the segments of space, and are arranged to sense a signal reflected off an athlete. The sensor(s) output a sensor signal indicating whether an athlete is present in each segment based on whether a reflected signal is detected from that segment. The segments are angularly positioned about the device so that the sensor(s) signals may be assessed to determine angular progression of the athlete relative to the device.

20 Claims, 4 Drawing Sheets

(51) Int. Cl.
*G01S 15/42* (2006.01)
*G01S 15/88* (2006.01)
*A63B 69/00* (2006.01)

(52) U.S. Cl.
CPC ....... *A63B 2220/30* (2013.01); *A63B 2220/40* (2013.01); *A63B 2220/802* (2013.01); *A63B 2220/83* (2013.01); *G01S 15/10* (2013.01); *G01S 15/42* (2013.01); *G01S 15/88* (2013.01)

(58) Field of Classification Search
USPC ......................................................... 340/8.1
See application file for complete search history.

(56) References Cited

U.S. PATENT DOCUMENTS

| | | | |
|---|---|---|---|
| 2009/0179790 A1* | 7/2009 | Jahangir | G01S 13/9029 342/25 B |
| 2014/0184207 A1* | 7/2014 | Rosenmoeller | A63B 71/0605 324/207.22 |
| 2016/0109574 A1* | 4/2016 | Leegate | G01S 17/74 340/10.4 |
| 2016/0132705 A1* | 5/2016 | Kovarik | G06K 7/10376 340/10.3 |

OTHER PUBLICATIONS

"Cone2020 Wins ProFit Design Competition", Dec. 12, 2013, 2 pages.

\* cited by examiner

METHOD AND APPARATUS FOR DETECTING PHYSICAL PERFORMANCE

TECHNICAL FIELD

The present invention relates to the detection of a passing athlete by a sensor device, and in particular to a device which monitors angular progression of an athlete relative to a mark.

BACKGROUND OF THE INVENTION

A large variety of physical markers have been proposed for the purpose of being distributed on a playing field or running track or the like in an effort to create visual cues, boundaries or markers, with the intention to provide fixed frames of reference for a multitude of athletic training and playing modalities. In the simplest form, these markers might indicate the corners of a playing field, or may comprise a timing gate configured to detect a time at which an athlete passes the gate or marker. In a more complex arrangement they might indicate a predefined pattern through which a player might move. Some proposals require the athlete to wear a receiver, or suitably reflective clothing, however these requirements are detrimental as in most training environments it is preferred to replicate playing conditions as closely as possible. Moreover, specialised equipment or clothing to be carried by the athlete also increases the cost of the training system.

Global positioning systems can be used to track athlete movements over distances of the order of tens of meters or more, but do not provide sufficient spatial resolution for studying smaller scale athlete movements such as acceleration off a start or changes of direction. Nor does GPS permit indoor operation.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

According to a first aspect the present invention provides a device for sensing a passing athlete, the device comprising:
at least one signal source for irradiating a plurality of distinct segments of space about the device;
at least one sensor associated with the segments of space, the or each sensor arranged to sense a signal reflected off an athlete and to output a sensor signal indicating whether an athlete is present in each segment based on whether a reflected signal is detected from that segment;
wherein the segments are angularly positioned about the device so that the sensor signal may be assessed to determine angular progression of the athlete relative to the device.

According to a second aspect the present invention provides a method of sensing a passing athlete, the method comprising:
irradiating a plurality of distinct segments of space about a sensing device;
sensing a signal reflected off an athlete; and
outputting a sensor signal indicating whether an athlete is present in each segment based on whether a reflected signal is detected from that segment,
wherein the segments are angularly positioned about the device so that the sensor signal may be assessed to determine angular progression of the athlete relative to the device.

According to a third aspect the present invention provides a non-transitory computer readable medium for sensing a passing athlete, comprising instructions which, when executed by one or more processors, causes performance of the following:
irradiating a plurality of distinct segments of space about a sensing device;
sensing a signal reflected off an athlete; and
outputting a sensor signal indicating whether an athlete is present in each segment based on whether a reflected signal is detected from that segment,
wherein the segments are angularly positioned about the device so that the sensor signal may be assessed to determine angular progression of the athlete relative to the device.

In some embodiments of the invention a single signal source and a single sensor are associated with each segment of space, whereby the signal source directionally irradiates only that segment of space, and the sensor directionally senses reflections only from that segment of space.

In alternative embodiments the irradiating may be performed in an omnidirectional manner, or at least in a manner whereby a single source irradiates more than one of the segments of space. In such embodiments one sensor is preferably provided in respect of each segment, each sensor being configured to detect reflections only from the associated segment of space.

In alternative embodiments, a sensor may be omnidirectional, or may be configured to sense reflections from more than one segment. In such embodiments, the irradiating may be performed in a directional manner in respect of each segment, and for example irradiation of the segments of space may be performed in a multiplexed manner such as a time multiplexed manner in which only one segment is irradiated at a given time, or in a frequency multiplexed manner in which each segment is irradiated with a unique frequency signal, or both, so as to enable signals sensed by an omnidirectional sensor to be associated with the respective segment of space from which they were reflected.

In some embodiments of the invention, either or both of the signal source and the signal sensor may be variably directional, as may be effected by a rotating mirror, antenna or concentrator, whereby the signal source and/or signal sensor is associated with the respective segment of space on a time multiplexed basis.

In some embodiments of the invention, each sensor is further configured to measure a distance of the athlete from the respective sensor while in that segment, to permit a point-wise trajectory of the athlete to be captured as the athlete passes or rounds a mark being monitored by the device. For example a time-of-flight of reflected signals reflected off the athlete or reflected off a vehicle piloted by the athlete may be monitored in order to measure the athlete or vehicle distance. Moreover, in such embodiments a plurality of measurements of the athlete's distance may be made as the athlete passes through one, or each, segment, to permit improved determination of trajectory. In such embodiments, a direction of travel of the athlete may be determined by reference to a preceding and/or succeeding segment occupied by the athlete.

The irradiating, and the sensing, may comprise any one or more of optic, sonic, ultrasonic, RF, radar or microwave radiation, or a signal of any suitable spectrum which reflects sufficiently off an athlete to be detected.

In many embodiments, due to the non-zero beam width of many suitable irradiating and sensing devices, each segment will subtend a non-zero angle at the device. In such embodiments, a time at which the athlete is deemed to pass that segment may be the estimated time at which the centre of mass of the athlete is estimated to occupy the centre of the angle subtended by the segment. In order to estimate this time, some embodiments of the present invention may take a first time stamp when the athlete enters the segment and a second time stamp when the athlete leaves the segment. The time estimate may comprise an average of the first time stamp and the second time stamp. Alternatively, third and fourth (or up to n) time stamps may be obtained when the athlete enters and leaves an adjacent segment, and a polynomial may be fitted to the first through fourth time stamps (or up to n) in order to produce a time estimate for when the athlete was at the centre of each segment. In still further embodiments athlete velocity may be estimated by communicating with a second device a known distance away and determining from the times at which the athlete passed the respective devices and from the known distance an estimated velocity of the athlete.

In order to estimate the centre time at which the centre of mass of the athlete is estimated to occupy the centre of the angle subtended by a segment, embodiments of the invention may additionally or alternatively measure a first distance between the device and the athlete when the athlete enters the segment, and a second distance between the device and the athlete when the athlete exits the segment. Knowledge of such time and distance information for a single segment allows the centre time to be estimated, and obtaining such information for other adjacent segments passed through by the athlete may permit improved accuracy of the estimate of the centre time and athlete trajectory in each segment.

In embodiments in which both the presence of an athlete in a segment and the distance of the athlete from the device are detected, a single sensor may be relied upon both to determine athlete presence and athlete distance. Alternatively, in some embodiments athlete presence may be determined by a first sensor associated with that segment, and athlete distance may be determined by a second sensor associated with the same segment. Operation of the second sensor may occur only in response to the first sensor indicating presence of an athlete.

In some embodiments of the invention the sensor(s) and/or signal source(s) are positioned upon the device so that the segments of space occupy the entire 360 degrees around the device and thereby encircle the device. In these or other embodiments the segments of space may partly overlap each other, or may be discretely located in a non-overlapping relationship.

The device may comprise signal source(s) and sensor(s) configured to define N segments of space being segments of space subtending an azimuthal angle of about 360/N degrees, and being positioned at constant radial spacing azimuthally about the device. For example in some embodiments 6 sensors are provided, each being associated with a segment of space subtending an angle of about 60 degrees, and each segment being radially positioned at spacings of 60 degrees about the device. Additionally or alternatively, the signal source(s) and sensor(s) may be configured in a manner to define M segments of space subtending respective elevational angles, such as each segment subtending an elevational angle of 180/M degrees in order to monitor the hemisphere above the horizon. Such embodiments may be useful to monitor the trajectory of an athlete passing over the device or jumping near the device, such as a jumping athlete. Moreover, some embodiments may additionally or alternatively define segments of space extending elevationally below the horizon. Both azimuthal and elevational segmentation may be provided by the device, for example an M×N array of segments, in order to track the angular progression and/or trajectory of the athlete relative to the device in both azimuth and elevation.

In some embodiments of the invention, each segment of space may extend substantially horizontally away from the device when in use, such as in the case of a waist-high post-mounted device. Alternatively, the segments may extend upwardly and radially away from the device when in use, such as in the case of a ground-mounted device. For example the signal source and sensor associated with each such segment may be canted upwardly at between 0 and 90 degrees from the horizontal, more preferably between 5 and 60 degrees, more preferably between 10 and 45 degrees, such as being canted upwardly at 30 degrees.

In some embodiments of the invention the device may further comprise a virtual coach function, comprising software configured to analyse the time and/or distance data measured in respect of each segment for comparison to a previous or desired profile and for producing a visual or audible output such as a synthesised voice to convey to the athlete the outcome or adequacy of the task just performed.

In some embodiments of the invention, the device may further comprise visible indicators, such as one or more LED indicators, on the device, configured to effect dynamic course setting by illuminating only as the athlete approaches, to tests the athlete's performance and variability thereof, including but not limited to response time and/or reflexes. In such embodiments, the approach of the athlete may be determined by a time-of-flight distance measurement performed by the device using the sensors, or with Doppler or reflective techniques, with the visible indicators activated only when the sensors indicate that the athlete is within a predefined distance of the device. Such embodiments may thus provide a single device which performs the tasks of (a) detecting athlete approach; (b) indicating a dynamic course setting; and (c) sensing the athlete's trajectory in response to the dynamically indicated course, enabling reaction time and agility to be assessed.

The height, size and/or range of each segment may be configured in order to monitor the performance of any athletic endeavour involving approaching, passing or rounding a mark or changing direction, including without limitation tasks involved in handball, football, ice hockey, basketball, soccer whether field players or goalkeepers, American football, table tennis, volleyball, tennis, badminton, baseball, basketball, floor ball, luge, bobsled, snow sports, military personnel exercises, injury or disability rehabilitation, and even animal training or competing exercises or drills such as for working or show dogs or general fitness testing and training. Accordingly the term "athlete" is broadly used herein to refer to a human, or an animal, or a vehicle or vessel piloted by a human engaged in such athletic endeavours.

The angular progression of the athlete relative to the device may be monitored in relation to an athlete moving in a straight line, or may be monitored in relation to a moving athlete changing direction.

The device may be battery powered, solar powered, wirelessly powered or, less desirably, mains powered.

The device may comprise a storage means to store the or each sensor signal, and/or may comprise a transmitter configured to transmit the or each sensor signal and/or time and distance data from the device to a supervisory device. A plurality of sensor devices may be configured to communicate with a single supervisory device in order to unify implementation of an obstacle course or the like amongst multiple devices in accordance with the present invention.

BRIEF DESCRIPTION OF THE DRAWINGS

An example of the invention will now be described with reference to the accompanying drawings, in which.

DESCRIPTION OF THE PREFERRED EMBODIMENTS

Figure 1:
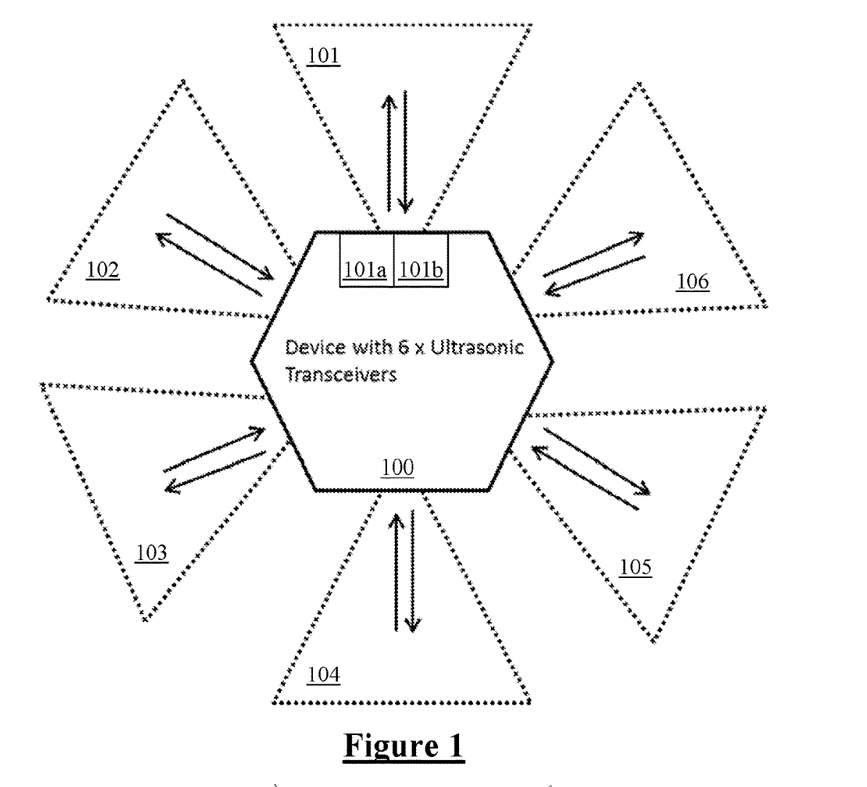
FIG. 1 is a plan view of a marker device in accordance with a first embodiment of the present invention.

FIG. 1 is a plan view of a marker device 100 in accordance with a first embodiment of the present invention. Device 100 comprises six ultrasonic signal sources 101a (other five sources not shown) which irradiate respective segments of space 101-106 which are adjacent to and radially positioned around device 100. Ultrasonic signals directed into each segment of space will be reflected back to the device 100, as indicated by radially inwardly pointing arrows in FIG. 1, if an object such as an athlete is present in that segment. Ultrasonic sensors 101b (other five sensors not shown) associated with each segment of space 101-106, are configured to sense reflected signals from that respective segment.

Figure 2A:
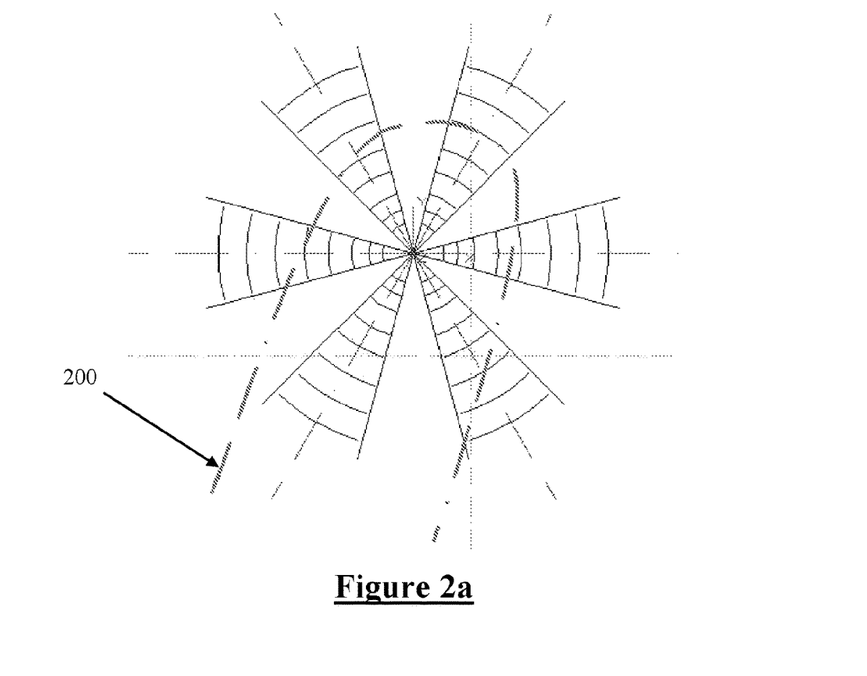
FIG. 2a is a schematic illustrating the trajectory of an athlete rounding a mark and passing through monitored segments of space.

Thus, analysis of the signals sensed by each respective ultrasonic sensor enables a determination to be made as to when an athlete was present in that segment. For example, FIG. 2a illustrates the trajectory 200 of an athlete around the device 100. It can be seen that as the athlete rounds the device, we can determine T1 and T2 on each sensor, being the respective times at which the athlete enters and leaves the segment of space associated with each sensor. The radial distance of the athlete from the sensor is also taken into account which, together with knowledge of the angle of divergence of the ultrasonic source and/or sensor, allows point-wise trajectory to be trigonometrically determined. Such determinations are achieved by the device 100 transferring raw sensor data to a receiving device for analysis in either near real time or post-testing.

Figure 2B:
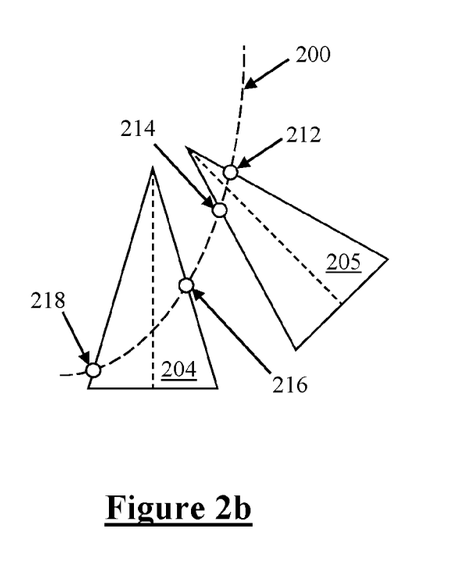
FIG. 2b illustrates time and distance determination in respect of two segments.

FIG. 2b illustrates trajectory determination in more detail. A time $t_1$ at which the athlete arrives at point 212, being the time at which the athlete enters segment 205, can be determined due to the onset of reflections detected by the sensor associated with segment 205. Moreover, in the present embodiment a distance $d_1$ of the athlete from the device 100 is determined by monitoring a time-of-flight of the reflected signal, which will have travelled the distance $d_1$ twice. From the measured time of flight, and the known speed of propagation of the ultrasonic signal used, $d_1$ can be calculated. A time $t_2$ at which the athlete leaves segment 205 at location 214, and an associated distance $d_2$, can similarly be determined. Further, $(t_3,d_3)$ and $(t_4,d_4)$ in relation to locations 216 and 218 where the athlete enters and leaves segment 204 can similarly be determined.

The $t_n,d_n$ points can then be fitted to determine the athletes' trajectory 200.

It can further be useful to identify when an athlete's centre of mass was at the angular centre of a segment, as indicated by dotted mid-lines in segments 204 and 205. It is noted that this time, and the position radially at that time, can be estimated from the fitted curve 200. Such a method of determining the mid-points may be useful at reducing the noise and/or inaccuracy in detecting edge positions for each segment.

Figure 3:
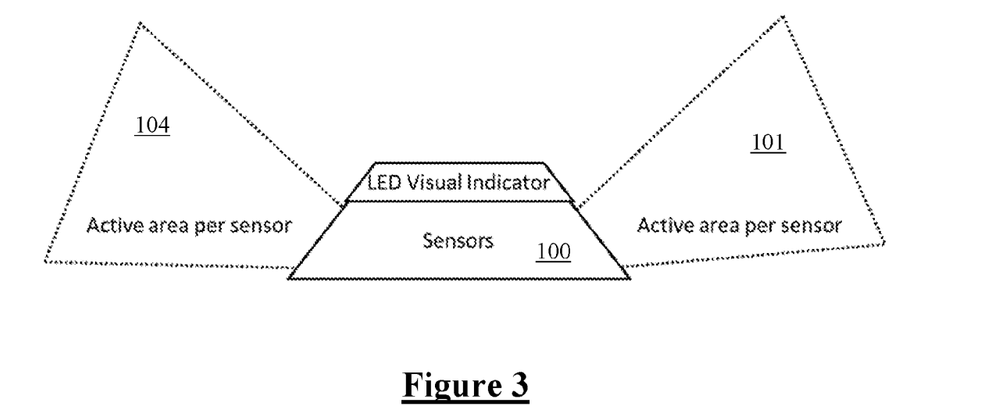
FIG. 3 is an elevation view of the ground-mounted device of FIG. 1, having upwardly canted sensed segments.

FIG. 3 is an elevation view of the ground-mounted device 100, illustrating the upward canting of the sensed segments 101 and 104, in order to avoid ground reflections and improve detection of the torso of an athlete. Segments 102,103,105,106 are omitted from FIG. 3 for illustrative clarity.

Figure 4:
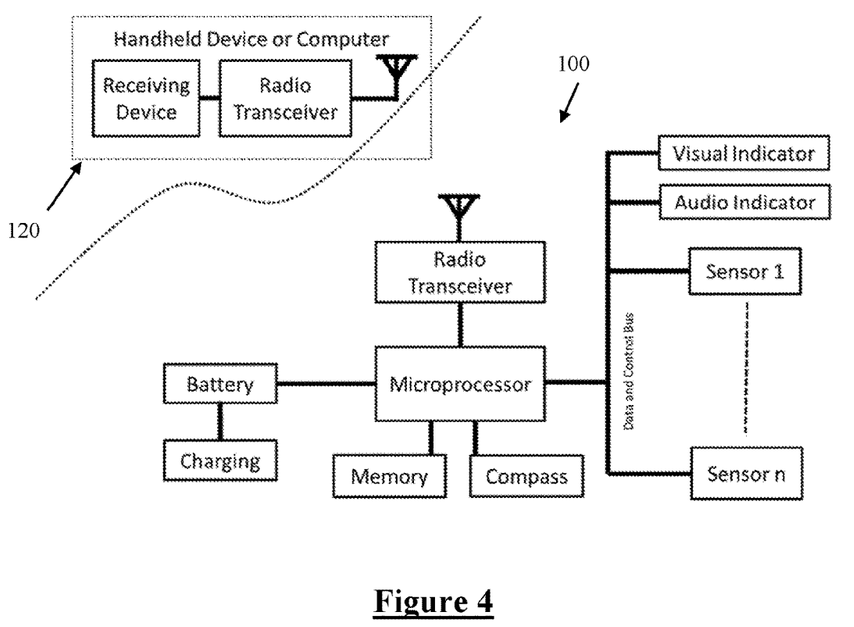
FIG. 4 is a system schematic of the active components of the device of FIGS. 1 and 3, and of an associated handheld device.

FIG. 4 is a system schematic of the active components of the device 100, and of an associated handheld device 120.

Figure 5:
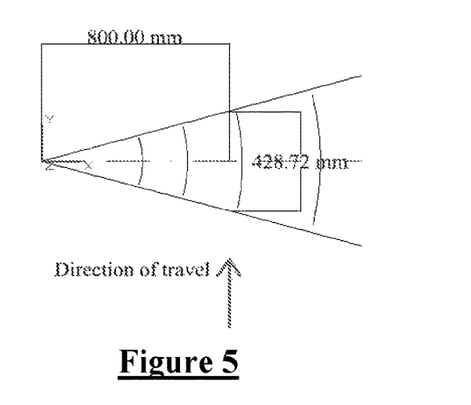
FIG. 5 is a schematic illustration of an athlete passing through one sensed segment.

FIG. 5 is a schematic illustration of an athlete passing through one sensed segment. This illustrates typical segment range in embodiments utilising pulsed ultrasonic irradiation. In such embodiments the ultrasonic output is pulsed at a rate that allows as many echo signals as possible given the maximum distance the device is specified for; thus, the inter-pulse interval is the time it takes for the previous pulse to travel to that maximum distance, reflect off an athlete, and return back to the device, without creating ambiguity relative to the return time of a subsequent reflected pulse off a closer object. Thus, the larger the defined maximum distance, the slower the pulse rate. However, in another embodiment pulse bursts, each burst comprising temporarily unique pulses, may be used to irradiate the segment so that a high pulse burst rate may be utilised for improved time registration of the athlete, while still allowing differentiation between longer distances. The pulse burst need only be unique for so long as the maximum time-of-flight of reflections. Each pulse burst may be temporarily unique in terms of any variable, such as the number of pulses, pulse width, or pulse frequency within each burst.

FIG. 5 is also illustrative of the use of a device in accordance with the present invention in relation to an athlete moving in a straight line. As shown, the ultrasonic beam has an angle of divergence of 30 degrees. The defined maximum sensing distance is 3 meters, in this embodiment. An athlete will normally pass within about 80 cm of the device. Thus about 400 mm of the trajectory of the athlete is within the segment of space defined by the beam. In the case of a 100 meter sprinter, and where the device is more than about 40 meters from the start, the athlete's velocity might be assumed to be constant around 10 m·s$^{-1}$. In this case, the approach is to detect T1 when the runner enters the active area, and T2 when the runner departs the active area. The athlete will thus be in the beam for only about 40 ms. It can be assumed that the actual time of crossing the centre of the beam, Tc, will be Tc=(T1+T2)/2.

On the other hand, when the athlete is still accelerating near the start of a sprint, this simple equation is less accurate. To estimate the corrections that need to be applied, one method is to provide at least three devices adjacent to the straight line trajectory of the athlete, at known spacings such as at 5 m, 15 m and 40 m from the start. The value T=To+(T1−T2)+0.3 is determined for each device, as a first estimate of when the athlete passes the device. The factor of 0.3 s is used to correct for assumed torso position. After this estimate is produced for each device along the track, a 3rd order polynomial having a minimum at zero is fitted to each device's estimate, to extrapolate a full velocity profile across the run. At each device, the fitted velocity profile and the local T1 and T2 time are used to determine the slope of velocity (acceleration) as the runner moves through the active area of that sensor, from which the true time that the runner's centre of mass is perpendicular to the device is estimated. It is noted that this embodiment could be implemented using any proximity sensor even without the ability to measure distance.

Figure 6:
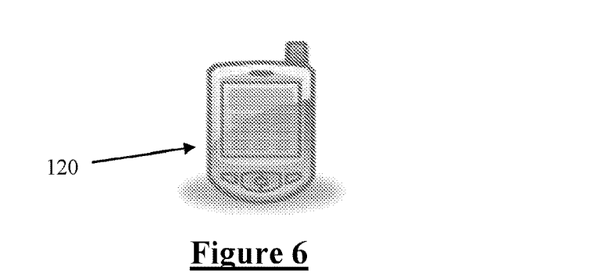
FIG. 6 is a systems schematic of a system comprising multiple marker devices in accordance with the present invention, controlled by a handheld device.

FIG. 6 is a systems schematic of a system comprising multiple marker devices in accordance with the present invention, controlled by the handheld device 120. Handheld device 120 controls a radio network for data retrieval from the marker devices. The device 120 may be carried by a coach or observer, or by the athlete.

Figure 7:
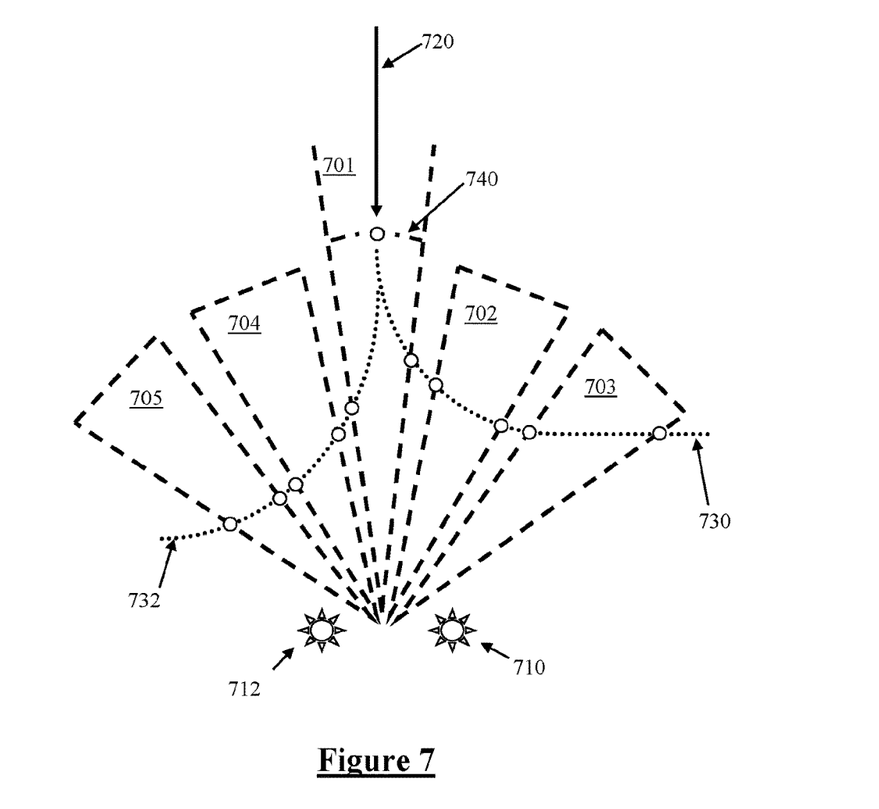
FIG. 7 illustrates a device in accordance with another embodiment of the present invention configured for agility testing.

FIG. 7 schematically illustrates operation of a device in accordance with another embodiment of the present invention, configured for agility testing. In accordance with typical agility testing the athlete is instructed to run towards the device, as indicated by trajectory 720, and a visual indicator, in this case comprising a left turn light 710 and a right turn light 712, instructs the athlete to proceed either to their left, as indicated by trajectory 730, or to their right, as indicated by trajectory 732. The visual indicator in this embodiment is activated only when the athlete crosses a threshold 740.

In this embodiment the threshold 740 is defined only as an ultrasonically sensed distance detected by the device, and no other marker or painted line on the ground is required in order to define threshold 740. The sensor associated with segment 701 monitors a range of the athlete as the athlete approaches the device along trajectory 720. As soon as the sensor associated with segment 701 determines that the athlete has come within a distance which indicates that the threshold 740 has been crossed, the visual and/or audible indicator is activated.

In a first pass, left turn indicator 710 is activated and the athlete might follow trajectory 730. Points along the trajectory 730 are sensed as the athlete leaves segment 701, and then enters and leaves segments 702 and 703 in turn, in the manner described above in relation to FIG. 2b. In a second pass right turn indicator 712 is activated and the athlete might follow trajectory 732. Points along the trajectory 732 are sensed as the athlete leaves segment 701, and then enters and leaves segments 704 and 705 in turn, again in the manner described above in relation to FIG. 2b. Fitted trajectories 730 and 732 might then be assessed for numerous variables such as (a) to compare the athlete's left/right balance which in this case would indicate an imbalance and may lead to a conclusion of a relative left leg weakness, (b) the reaction time required before the athlete exits segment 701, in each direction, (c) the radius of each trajectory, (d) velocity of the athlete between each pair of detected points or averaged across more than 2 points, and the like.

A plurality of devices operating in the manner shown in FIG. 7 may be distributed throughout a training space and may be configured to direct the athlete along a predefined path, each turn in the course only being revealed to the athlete as they approach each marker. In such systems, each device is configured to activate as the athlete approaches, and to deactivate irradiation of the associated segments after the athlete has passed, so as to minimise creating background noise during operation of nearby devices. It is further noted that the visual indicator may alternatively be an audible alert and/or may be used to signal an athlete for specific actions, such as stop, start, turn.

In the described embodiments, one ultrasonic source is used to irradiate all segments. All sensors are activated to detect, amongst spurious echoes received, which sector the athlete is in. However, alternative embodiments may sequentially irradiate one or a subset of the segments. Such sequential irradiation beneficially is performed in the sequence {101,104,102,105,103,106,101, etc}. This method ensures less multi-path echo from an adjacent transmitter as the irradiation is switched substantially to an opposite side of the device each time. Alternative embodiments may however utilise any desired sequence of switching of irradiation amongst the respective segments.

Some embodiments of the present invention thus recognise that runners in sports such as baseball should round a mark, such as a baseball base, at a certain ideal angle and trajectory, and provide a means whereby the runner's angles of approach and departure, and non-linear velocity, can be measured.

The device may further comprise one or more photoelectric beams and sensors configured to detect when an athlete breaks the or each photoelectric beam, in order to also implement a conventional timing gate. For example a device in accordance with the present invention configured for an agility test may use two photoelectric beams, or two pairs of photoelectric beams, angularly positioned either side of a line-of-approach, such as one photoelectric beam between segments 701 and 702 and another photoelectric beam between segments 701 and 704, to time how quickly the athlete reacts to dynamic course setting as a measure of the athlete's reaction time.

In further embodiments the athlete may carry a device comprising an identifying communication device, accelerometers, GPS and/or Bluetooth. For example to allow the handheld 120 to analyse athlete performance and transmit feedback to the athlete via haptic feedback, Google glass, a voice headset or the like. Moreover, the functions provided by the handheld 120 may in alternative embodiments be performed by an alternative device such as a headset, Google Glass device, haptic device or any other suitable user interface.

The described electronic functionality can be implemented by discrete components mounted on a printed circuit board, or by a combination of integrated circuits, or by an application-specific integrated circuit (ASIC). The computing devices can operate using any of the generally available operating systems.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not limiting or restrictive.

The invention claimed is:

1. A device for sensing a passing athlete, the device comprising:
    at least one signal source for irradiating a plurality of distinct segments of space around the device; and
    a plurality of signal sensors associated with the segments of space, wherein the plurality of signal sensors is arranged to output sensor signals indicating whether an athlete is present in each segment based on whether a reflected signal is detected from that segment;
    wherein the segments are angularly positioned around the device so that the sensor signal may be assessed to determine angular progression of the athlete relative to the device.

2. The device of claim 1, wherein a single signal source and a sensor of the plurality of sensors are associated with each segment of space, whereby the signal source directionally irradiates only that segment of space, and the sensor directionally senses reflections only from that segment of space.

3. The device of claim 1, wherein the signal source is configured to irradiate more than one of the segments of space.

4. The device of claim 1, wherein the at least one signal source is configured to irradiate the distinct segments of space in a multiplexed manner.

5. The device of claim 1, wherein the plurality of signal sensors is configured to sense the reflected signal in a multiplexed manner.

6. The device of claim 1, wherein the plurality of signal sensors is configured to measure a distance of the athlete from the respective signal sensor while in that segment, to permit a point-wise trajectory of the athlete to be captured.

7. The device of claim 6, wherein the plurality of signal sensors is configured to monitor a time-of-flight for a signal reflected off the athlete.

8. The device of claim 1, wherein the irradiation comprises ultrasonic irradiation.

9. The device of claim 1, further comprising a transmitter configured to transmit each sensor signal and/or time and distance data from the device to a supervisory device.

10. A method of sensing a passing athlete, the method comprising:
    locating a sensing device having signal sensors which define a plurality of distinct segments in a training space for the athlete;
    irradiating the plurality of distinct segments around the sensing device;
    sensing a signal reflected off an athlete moving in the training space along a trajectory which passes through at least some of the segments; and
    outputting a sensor signal indicating whether an athlete is present in each segment based on whether a reflected signal is detected from that segment,
    wherein the segments are angularly positioned about the device so that the sensor signal may be assessed to determine angular progression of the athlete relative to the device.

11. The method of claim 10, further comprising estimating a time at which a center of mass of the athlete is deemed to occupy the center of an angle subtended by the segment.

12. The method of claim 11, comprising taking a first time stamp when the athlete enters the segment, and taking a second time stamp when the athlete leaves the segment.

13. The method of claim 12, further comprising fitting a polynomial to the first and second time stamps and to time stamps obtained from other segments, in order to produce a time estimate for when the athlete was at the center of each segment.

14. The method of claim 11, comprising measuring a first distance between the device and the athlete when the athlete enters the segment, and measuring a second distance between the device and the athlete when the athlete exits the segment.

15. A marker device for sensing a passing athlete, including:
    a plurality of transceivers mounted on a support and arranged in segments around an axis;
    each transceiver having a signal source which irradiates the respective segment and a sensor which receives a signal reflected by the athlete when passing through the segment; and
    a control system for activation of the signal sources and communication of data from the sensors to a supervisory device.

16. The device of claim 15, comprising six transceivers equally spaced around a vertical axis in 60 degree segments.

17. The device of claim 15, wherein the transceivers irradiate their respective segments with ultrasound signals to be reflected from the passing athlete.

18. The device of claim 15, wherein the support is a post which mounts the transceivers above ground, or a base which mounts the transceivers close to ground.

19. The device of claim 15, wherein data from the control system includes timing of the athlete within the respective segments and distance of the athlete from the device.

20. The device of claim 15, further comprising one or more visible or audible indicators to provide directions for the athlete.

* * * * *